July 26, 1955 — A. U. BRYANT — 2,713,989
VALVE CONSTRUCTION
Filed Jan. 22, 1948 — 6 Sheets-Sheet 1
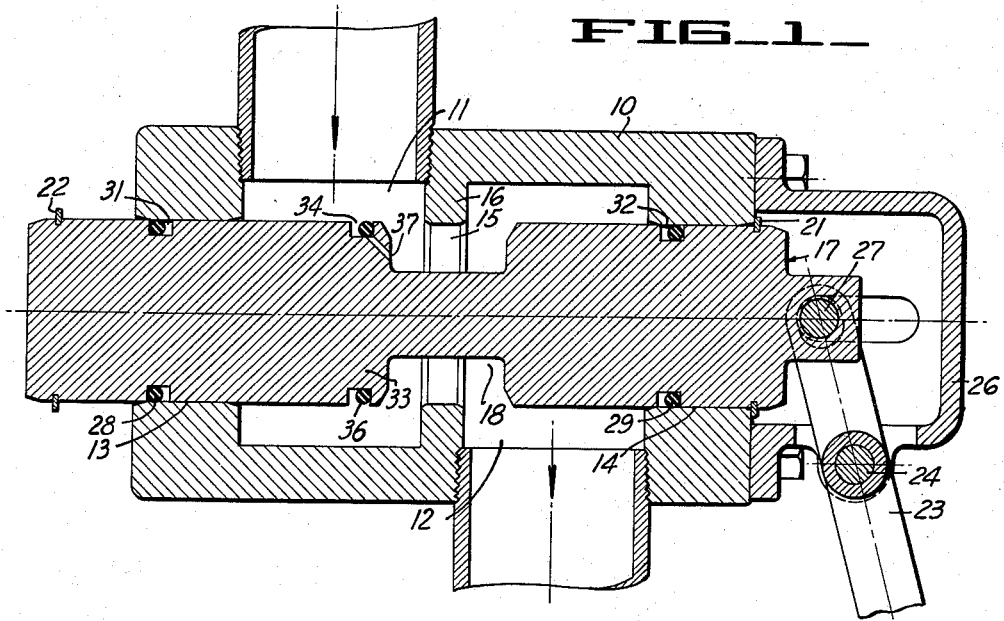
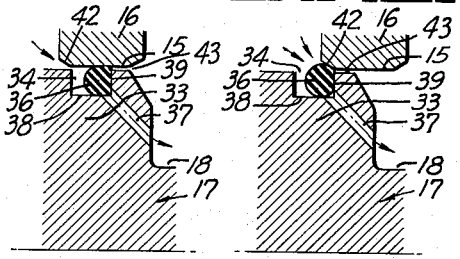
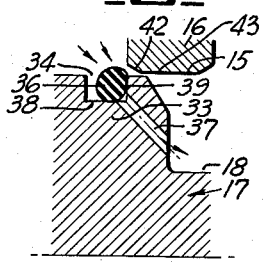
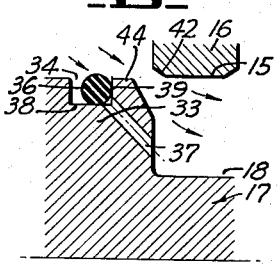
INVENTOR.
Austin U. Bryant
BY
ATTORNEYS July 26, 1955     A. U. BRYANT     2,713,989
VALVE CONSTRUCTION
Filed Jan. 22, 1948     6 Sheets-Sheet 2
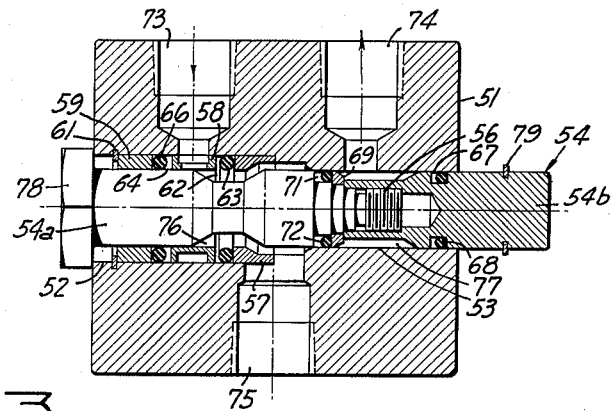
FIG_3_
FIG_4_
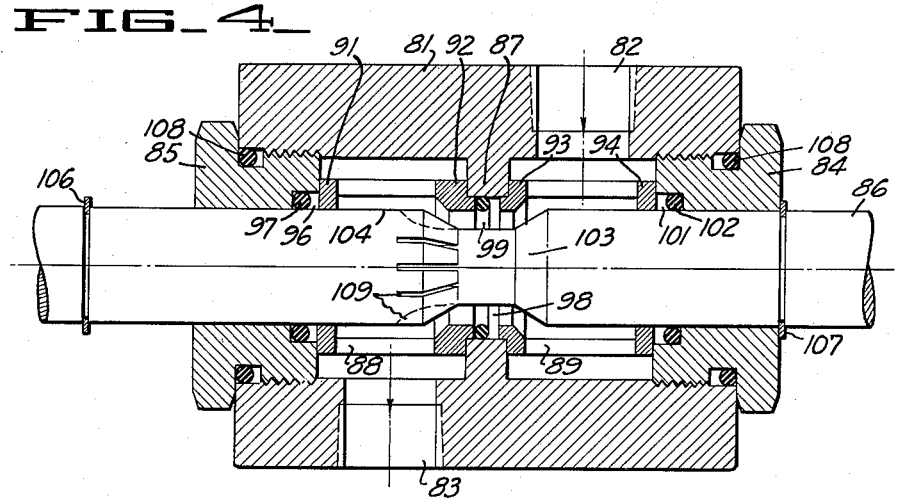
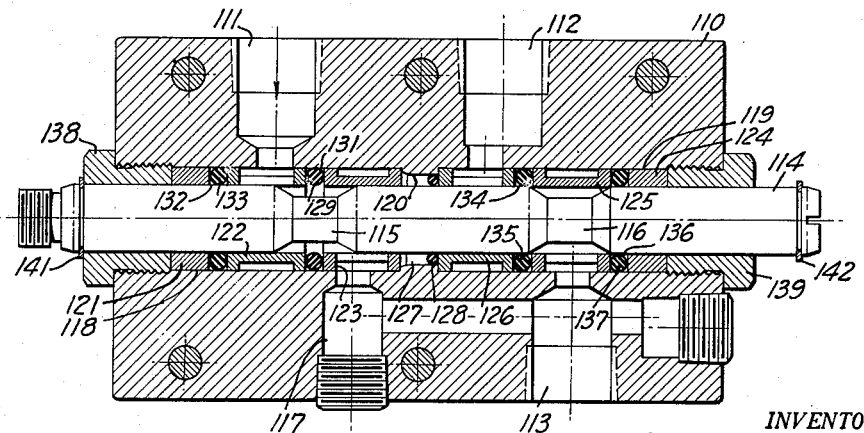
FIG_6_
INVENTOR.
Austin U. Bryant
BY
ATTORNEYS

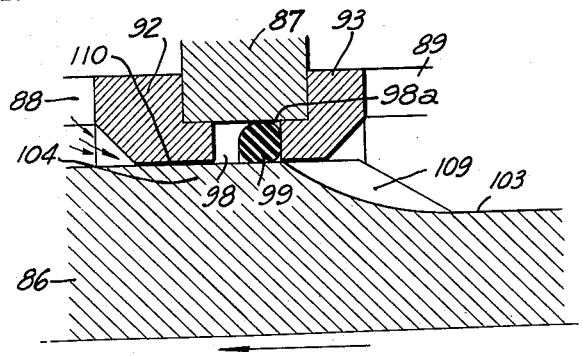
FIG_5A_
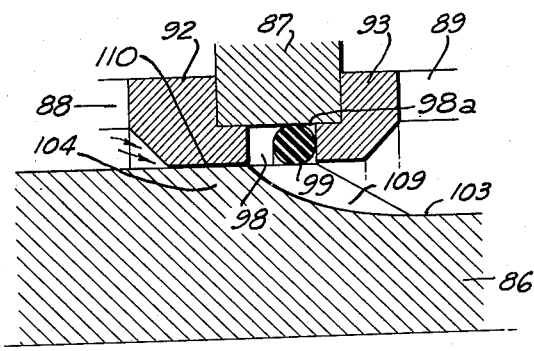
FIG_5B_
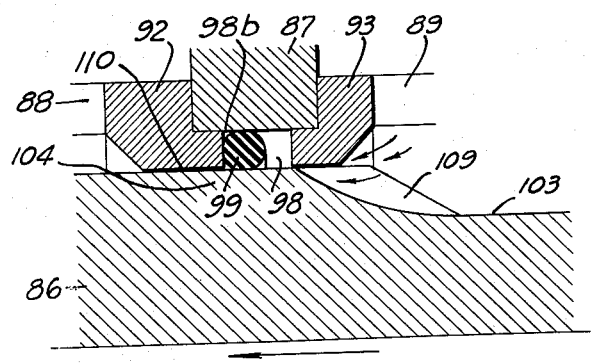
FIG_5C_

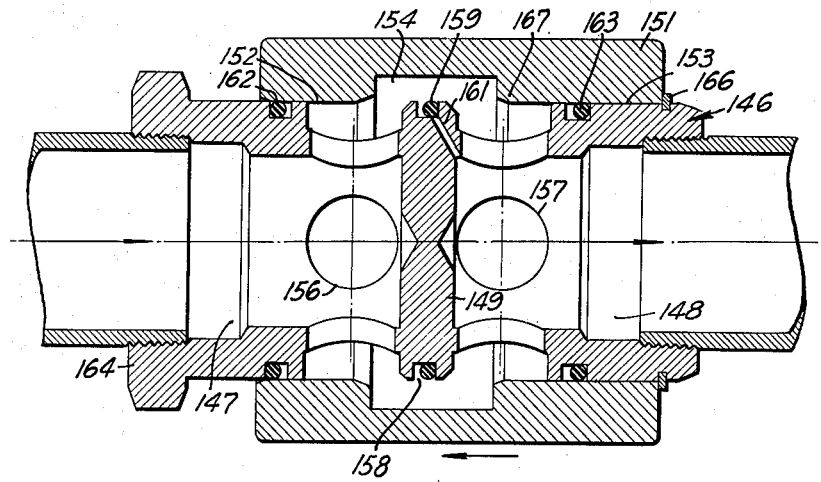
FIG_7_
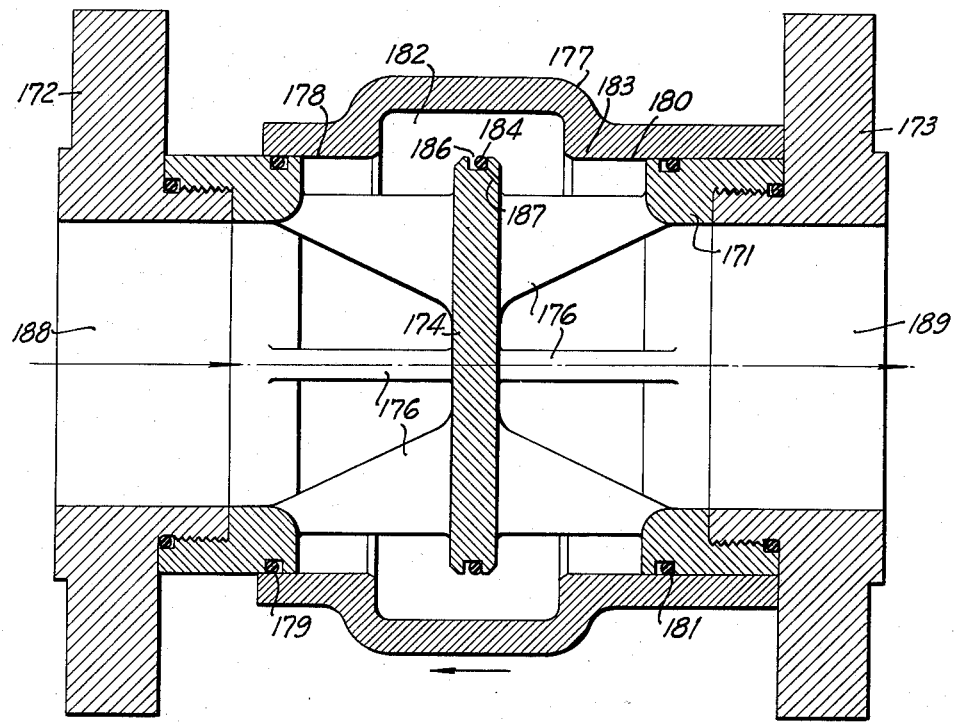
FIG_8_
INVENTOR.
Austin U. Bryant
BY
ATTORNEYS

July 26, 1955  A. U. BRYANT  2,713,989
VALVE CONSTRUCTION
Filed Jan. 22, 1948 6 Sheets-Sheet 5
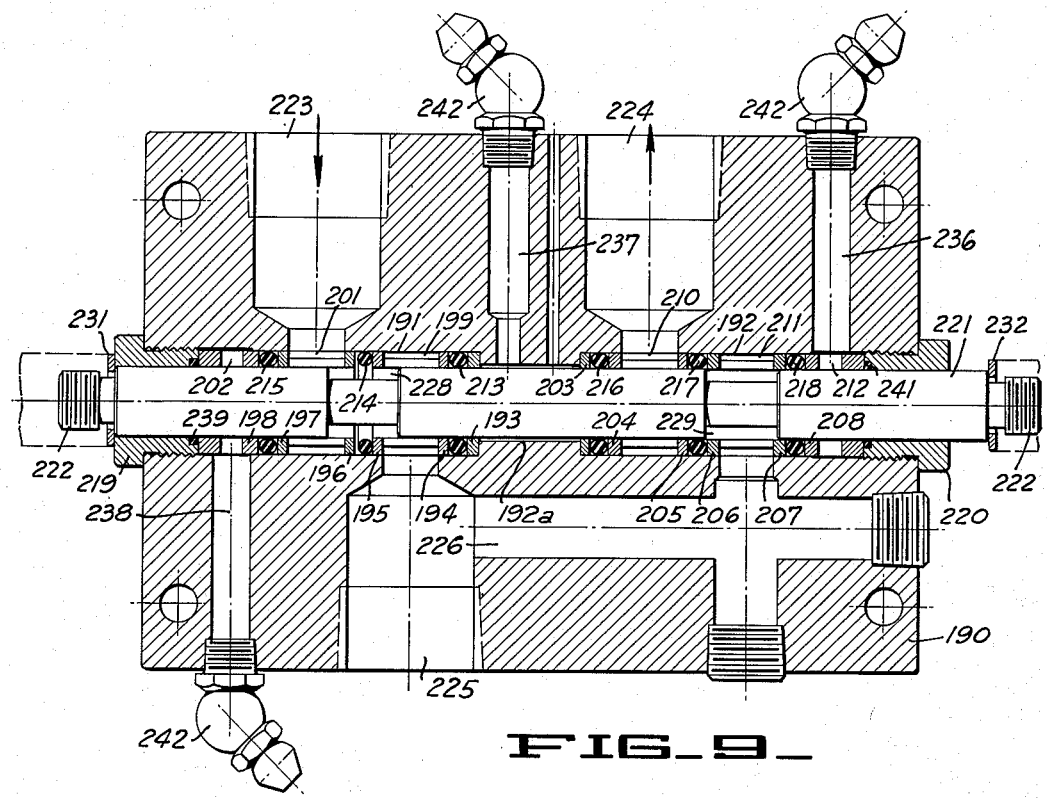
FIG_9_
FIG_10_
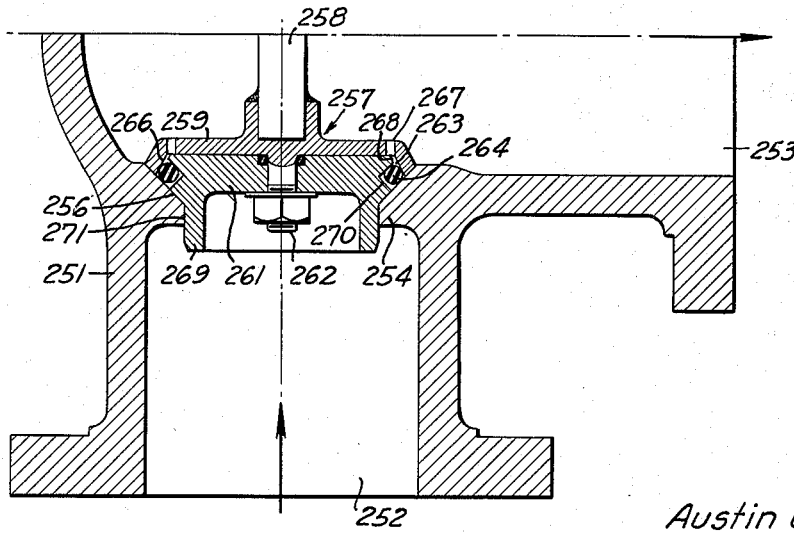
INVENTOR.
Austin U. Bryant
BY
Flehr & Swain
ATTORNEYS July 26, 1955  A. U. BRYANT  2,713,989
VALVE CONSTRUCTION
Filed Jan. 22, 1948  6 Sheets-Sheet 6
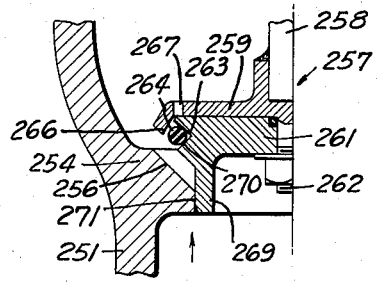
FIG_11_
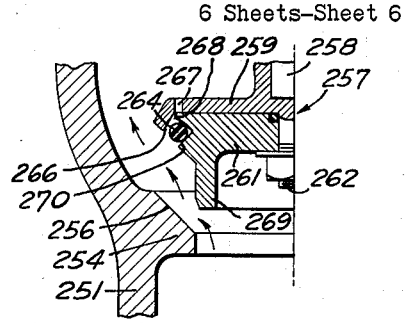
FIG_12_
FIG_14_
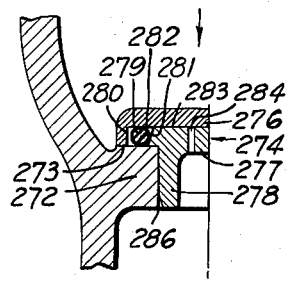
FIG_13_
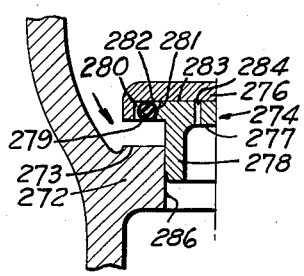
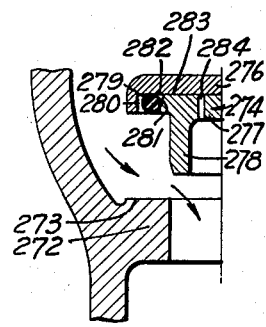
FIG_15_
FIG_16_
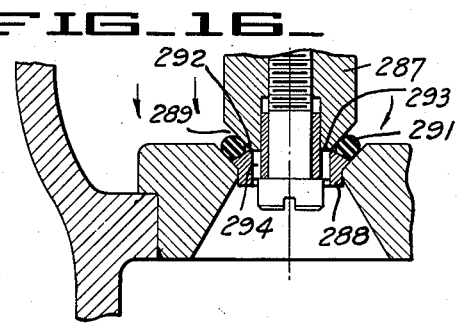
FIG_17_
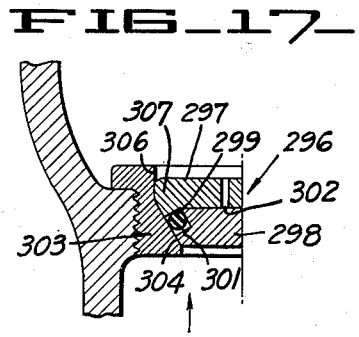
INVENTOR.
Austin U. Bryant
BY
ATTORNEYS

United States Patent Office 2,713,989
Patented July 26, 1955

2,713,989

VALVE CONSTRUCTION

Austin U. Bryant, Berkeley, Calif., assignor, by mesne assignments, to Grove Valve and Regulator Company, a corporation of California Application January 22, 1948, Serial No. 3,728

13 Claims. (Cl. 251—324)

This invention relates generally to the construction of valves for resisting fluid pressure and controlling fluid flow.

Of the many types of valves which have been used in the past it has been known that there is an unsatisfied demand for a valve of simple mechanical construction capable of withstanding relatively high fluid pressures without leaking, and which can be operated between open and closed positions without undue effort. Various globe valves are unbalanced in closed and partly closed positions, thus requiring considerable effort for the operation of a valve of given size. In addition it is difficult to maintain such valves "bubbletight" against leakage. Gate valves are likewise difficult to maintain tight against leakage, and they involve considerable operating friction, which increases with increase in pressure. Valves of the tapered or cylindrical rotating plug type require careful lubrication maintenance to minimize operating friction, and even when carefully lubricated it is difficult to eliminate all leakage. Some valves of the rotating disc type have been made capable of withstanding relatively high pressures with relatively low effort to turn the disc to different valve operating positions. However, such valves require accurate and carefully finished metal surfaces and are therefore relatively expensive to manufacture. In addition a small amount of abrasion or corrosion of the finished metal surfaces will result in leakage and causes additional operating friction.

It is an object of the present invention to provide a fluid control valve of relatively simple construction which is capable of withstanding relatively high fluid pressures without leakage.

Another object of the invention is to provide a valve which makes novel use of resilient seal rings, particularly rings of O cross-sectional contour, without causing such rings to be displaced from their normal position by fluid flow or the operating pressures involved.

Another object of the invention is to provide a valve construction which does not require undue effort for its operation.

Additional objects of the invention will appear from the following description in which the preferred embodiments of the invention have been set forth in detail in conjunction with the accompanying drawing.

Referring to the drawing:

Figure 1 is a side elevational view in section illustrating a valve incorporating the present invention.

Figures 2A, 2B, 2C and 2D are enlarged cross-sectional details diagrammatically showing the positioning of the valve operating parts in moving from closed to open positions.

Figure 3 is a side elevational view in cross-section illustrating a modification of the invention in which some of the resilient seal rings are carried by the outer member of the valve, and others by the inner member.

Figure 4 is an elevational view in cross-section illustrating another embodiment of the invention.

Figures 5A, 5B and 5C are diagrammatic enlarged details in section showing three positions of the valve parts of Figure 4.

Figure 6 is a side elevational view in section illustrating another embodiment of the invention.

Figure 7 is a side elevational view in section illustrating another embodiment of the invention.

Figure 8 is a side elevational view in section illustrating an embodiment of the invention particularly adapted for valves of the larger size.

Figure 9 is a side elevational view in section illustrating another embodiment of the invention somewhat similar to the embodiment of Figure 6, but simplified as to construction.

Figure 10 is a fragmentary side elevational view in section illustrating a valve of the globe type incorporating the invention.

Figure 11 is a detail in section showing the valve of Figure 10 with the valve member positioned to retract the seal ring from the stationary seat surface, but with the flow being restricted.

Figure 12 is a view like Figure 11 showing the valve member in full open position.

Figure 13 is a detail in section showing a modification of Figure 10 in which the seat surface is flat.

Figure 14 is a view like Figure 13 but showing the position of the valve member after initial opening movement.

Figure 15 is a view like Figure 13 showing the valve member in full open position.

Figure 16 illustrates a modification of Figure 10 in which the parts are arranged to seal against inflow pressure applied upon the top of the valve member.

Figure 17 is a detail in section illustrating a modification of Figure 10 in which after initial opening movement the flow is restricted by different means from that illustrated in Figure 10 to prevent displacement of the seal ring from its groove.

The embodiment of the valve illustrated in Figure 1 consists of a body member 10 provided with inflow and outflow passages 11 and 12. The body is bored on a longitudinal axis to provide the aligned cylindrical openings 13 and 14, and also the opening 15 in the annular portion 16. The portion 16 forms in effect a barrier between the inflow and outflow passages 11 and 12. Fitted within the body member 10 there is a plunger-like member 17, which is cylindrical in form, and which is dimensioned to have an easy sliding fit in the openings 13, 14 and 15. Intermediate its ends the member 17 is provided with an annular port 18 which is adapted to interconnect the inflow and outflow passages through the opening 15, for the open position of the valve illustrated in Figure 1.

It is desirable to limit relative movement between the two members 10 and 17 between positions representing full open and closed positions. Thus suitable stop shoulders 21 and 22 are provided upon the exterior end portions of the member 17, and can be in the form of snap-on rings as illustrated. These rings engage the end faces of the body member 10.

As representative of suitable operating means I have shown a lever 23 fulcrumed at 24 to the end housing 26, and pivotally attached by pin 27 to the member 17. Lever 23 may be connected to a suitable motive device such as a small electric solenoid.

Leakage of fluid past the end portions of the member 17, through the bores 13 and 14, is prevented by suitable means, preferably the resilient seal rings 28 and 29. These rings are carried within the annular recesses 31 and 32, and are proportioned whereby they are permanently compressed in a radial direction to secure the desired sealing effect, as is well known in the industry.

For closed position of the valve described above member 17 is moved to the right from the position shown in Figure 1, until the annular portion 33 of the member 17 occupies a position within the opening 15. In order to provide a fluid tight seal for closed position, portion 33 is provided with an annular recess 34, which is occupied by the resilient seal ring 36. This seal ring is dimensioned whereby when the valve is moved to closed position it engages the surface of bore 15 and is compressed somewhat in a radial direction. It is satisfactory to use a seal ring which is circular in cross-sectional contour (i. e. an O ring) as illustrated. Likewise it is satisfactory to form the recess 34 rectangular shaped (i. e. parallel sides 90° to the bottom of the recess) as illustrated.

Without the use of an additional feature the valve described above would not operate satisfactorily. The added feature is the provision of one or more ducts 37 in the portion 33, and which serves to connect the lower right hand corner portion of the recess 34 (i. e. that corner of the recess nearest the outflow side of the valve and adjacent the bottom or base of the recess) with the port 18. This duct provides substantially free pressure equalizing communication between the bottom or base of the recess 34, and the outflow side of the valve.

Figures 2A to 2D inclusive serve to illustrate operation of my valve with proper sealing accomplished by the ring 36. Referring first to Figure 2A, the parts are shown in closed position of the valve, with the seal ring 36 compressed in a radial direction, and without the duct 37. It is presumed that considerable fluid pressure is applied to the inlet passage 11, and that such pressure is being held by the seal ring 36. Fluid pressure applied to this ring urges it to the right as viewed in Figure 2A, whereby it is pressed against the bottom surface 38 of the recess, against the side recess face 39, and into the recess corner 41. Assuming first that one should close or omit the duct 37, then air or other gas being handled would be trapped in corner 41 and would be compressed to a pressure at least as high as that applied to the inlet opening. Then if one should start to open the valve by movement of member 17 to the position shown in Figure 2B, ring 36 would tend to expand outwardly, and to remain in contact with the beveled surface 42. Further movement of member 17 to the position illustrated in Figure 2C would cause the fluid pressure acting upon the ring 36 to continue to force it into engagement with the beveled surface 42, whereby the seal ring would tend to follow and remain in contact with the portion 16, while at the same time being stretched radially to carry it partly out of the recess 34. After movement of the parts to the position shown in Figure 2D, the seal ring would be completely carried out of the recess 34.

What is described above explains what tends to happen under relatively high fluid pressures without the ducts 37. Thus without these ducts, the valve would be substantially inoperative for the higher fluid pressures.

Figures 2A to 2D inclusive illustrate operation with the duct 37. For the fully closed position shown in Figure 2A the seal ring 36 is compressed in the manner explained above. When one commences to open the valve to the position shown in Figure 2B, the seal ring does not tend to move outwardly, because that side of the ring which is faced toward the corner 41 presents a substantial area to the low outlet pressure, while the ring presents a relatively smaller fluid pressure area to the outlet through the clearance 43 between bore 15 and the metal shoulder 33. Therefore the inlet pressure acting on the seal ring tends to urge it into the groove 34.

When the parts have reached the position illustrated in Figure 2C, the surface 42 has left the seal ring, but the seal ring remains in proper position in the recess 34. Fluid flow under such conditions is controlled mainly by the clearance 43, rather than by proximity of the seal ring to member 16. This tends to avoid subjecting the seal ring to a low pressure area due to high velocity fluid flow past the same. Also, it maintains a pressure differential which acts upon the O-ring to hold it in its accommodating groove, during initial flow through the valve. When the parts have moved to the position shown in Figure 2D, a sizable orifice has been formed between shoulder 33 and portion 16 for flow of fluid, and this orifice increases to maximum value for the full open position illustrated in Figure 1.

As explained above two features contribute to retention of the seal ring 36 within the groove 34, when operating the valve between open and closed positions. One feature is the venting of groove 34 through ducts 37, which causes inlet pressure to hold the ring within the groove during initial opening movement. The other feature is the control of the flow between metal to metal parts, mainly by the clearance 43, immediately after the member or plunger 17 has been retracted from engagement with the seal ring, and before opening movement has provided a substantial flow orifice.

One modification which can be made to the valve of Figure 1 is to place the resilient seal ring 36 upon the portion 16, instead of on portion 33. In this instance the annular recess is formed in the portion 16, and the cooperating portion 33 of the member 17 is provided with a cylindrical periphery to engage and seal upon the ring. That corner of the recess on the outflow side of the seal ring is vented to the outflow side by means of one or more ducts.

Figure 3 illustrates another embodiment of the invention in which a number of seal rings are employed, with certain of these rings being carried by the outer member, and some by the inner part. Thus the valve in this instance consists of a body part 51 which is provided with two aligned bores 52 and 53. The inner member designated generally at 54 is formed in two sections 54a and 54b, which are detachably secured by the threaded connection 56.

A number of annular parts are assembled within the bore 52, including the metal rings 57, 58 and 59 and the retaining clip ring 61. Rings 57 and 58 are spaced apart to form the annular recess 62, which accommodates the resilient O ring 63. Rings 58 and 59 are similarly spaced apart to form the recess 64, which accommodates the resilient seal ring 66.

Section 54b of member 54 is provided with an annular recess 67, to accommodate the resilient seal ring 68. A metal ring 69 is loosely carried between the sections 54a and 54b, and forms one side of the recess 71, which accommodates the resilient seal ring 72.

The body member 51 in this instance is provided with three fluid passages 73, 74 and 75. Sections 54a and 54b of the inner member are both formed to provide annular ports 76 and 77.

Longitudinal movement of the inner member 54 between open and closed positions is limited by suitable means such as the head 78 adapted to engage the adjacent end face of the body member 51, and the clip ring 79 on the other end of the member 54, and likewise adapted to engage the adjacent end face of the body member.

The valve of Figure 3 is well adapted for use as a control device for a remote operated valve of the type disclosed and claimed in Patent No. 2,353,143. Such a valve consists of an expansible rubber tube having a closed fluid chamber about the same, and connected with a control device whereby either fluid under pressure can be applied to the chamber, or the chamber vented to the atmosphere to the downstream side. Assuming that the device of Figure 3 is used to control such an expansible tube valve, passage 73 connects to the source of fluid pressure, which may be the upstream side, passage 75 connects with the chamber of the expansible tube valve, and passage 74 can connect to the atmosphere or to the downstream side of the expansible tube valve. For the valve operating position shown in Figure 3, passages 73 and 75 are connected by the port 76, and therefore fluid pressure is applied to the chamber of the expansible tube valve. At the same time, however, inflow pressure cannot enter the passage 74, because of the sealing effect of ring 72. When member 54 is moved to the left to bring the limiting shoulder 79 into engagement with member 51, port 76 is brought out of communication with the passage 75, and at the same time port 77 is brought into a position to establish communication between passages 74 and 75.

In the embodiment just described the resilient seal rings 63 and 72 are the rings which are used to control the flow of fluid.

Instead of utilizing distinctly formed ducts corresponding to the ducts 37 of Figure 1 to prevent dislodgment of these seal rings, I rely in the case of seal ring 63, upon clearance between the loosely fitted ring 57 and the adjacent walls of the body bore 52. This clearance forms in effect a duct which serves to establish pressure equalizing communication between that outer corner of the recess 62 which is on the outlet side, and the outlet passage 75. With respect to the seal ring 72 I rely upon clearance between the metal ring 69, and the adjacent surfaces of the member 54 which carries the ring. Such clearance likewise forms in effect a duct which establishes communication between the passage 74, or rather the port 77, and that corner of the recess 71 faced toward the outlet side.

The modification of Figure 3 also provides metal to metal control of flow while moving the member 54 between extreme positions. Thus when moving member 54 to the left as viewed in Figure 3, seal ring 72 is first disengaged from the body, and then initial flow occurs through the clearance between ring 69 and the body. Similarly when member 54 is moved to the right from its other limiting position, initial fluid flow occurs through the clearance between ring 58 and part 54a, thus avoiding control of flow by an orifice formed between the seal ring and the periphery of part 54a.

Because of the venting of the recesses 62 and 71 as described above, the valve can be used with relatively high fluid pressure without causing dislodgment of the seal rings 63 and 72.

Figure 4 illustrates an embodiment of the invention which can be used where some back pressure may be applied to the outflow passage or where pressure may be applied to either side. Thus in this instance the body member 81 is provided with the inflow and outflow passages 82 and 83. The body 81 is bored and threaded to receive the bushings 84 and 85 which in turn accommodate the inner member 86. The annular portion 87 within the body corresponds to the portion 16 of Figure 1. The body is also fitted with the ported sleeves 88 and 89, which have ring-like end portions 91 and 92, and 93, 94 respectively. Ring 91 is positioned against the inner end of the fitting 85 and serves to complete the recess 96 to accommodate the seal ring 97. Rings 92 and 93 are positioned upon opposite sides of the barrier portion 87, and form in conjunction with the inner periphery of the barrier an annular recess 98 for accommodating the seal ring 99. Ring 94 is positioned adjacent the inner end face of fitting 84 to complete an annular recess 101, which accommodates the seal ring 102. Member 86 has a portion of reduced diameter which forms in effect the annular port 103, and which for open position of the valve as illustrated in Figure 4 establishes communication between the passages 82 and 83. Annular portion 104 of the member 86 is adapted to cooperate with the seal ring 99 in closed position of the valve.

Longitudinal movement of the member 86 is limited by suitable means such as the snap-on rings 106 and 107. Leakage past the bushings 84 and 85 can be prevented by suitable means such as the resilient seal rings 108.

In order to facilitate two-way operation of the valve shown in Figure 4, portion 104 of the member 86 is provided with a plurality of slots 109. These slots communicate between the peripheral face of portion 104 and the port 103.

Operation of the valve shown in Figure 4 is best understood by reference to Figures 5A, 5B and 5C. Figure 5A shows the valve in full closed position, with the seal ring 99 compressed radially against the periphery of the portion 104. Assuming that pressure is being applied from the left hand side as indicated by the arrow in Figure 5A, then the seal ring 99 is urged against the ring 93, and the cavity 98a is vented to the low pressure side, through the clearance between ring 93 and the adjacent surface of the body portion 87.

When pressure is applied from the right hand side as indicated by the arrow in Figure 5C, the seal ring 99 is urged against the ring 92. The annular cavity 98b is in this instance vented to the low pressure side because of clearance between the ring 92 and the portion 87.

When pressure is applied to the left hand side as shown in Figure 5A, and the member 86 moved toward open position, slots 109 first pass beneath seal ring 99 (see Figure 5B) and serve to carry fluid flowing from the inlet side through the restricted clearance 110, the latter having a flow area which is substantially less than the flow area of slots 109. When member 86 has moved beyond the point of disengaging itself from contact with seal ring 99, slots 109 are eventually moved into direct communication with the inlet side and serve to provide a considerably greater flow orifice. At that time the blow through the slots 109 is not such as will dislodge the seal ring. Continued movement of member 86 to its limiting position as shown in Figure 4 forms an enlarged orifice through the port 103. Thus when one continues to move member 86 to the left from the position shown in Figure 5A, to that of Figure 4, the ring 99 remains in proper position, and is not dislodged from the recess 98, irrespective of the side to which fluid pressure is applied. However without the slots 109, and with application of pressure from the left hand side of Figure 5A, pressure would tend to dislodge the seal ring upon movement of member 86 to the left to the extent of removing it from its seal ring engaging position.

Figure 6 shows another type of three-way valve incorporating the invention. In this instance the body member 110 is provided with passages 111, 112 and 113, corresponding to the passages 73, 74 and 75 of Figure 3. The inner member 114 is provided with two reduced portions forming the ports 115 and 116.

For one position of the valve illustrated in Figure 6, passage 111 is in communication through port 115 with a passage 117 which in turn connects with the passage 113. For the other operating position the passage 112 is placed in communication with passage 113 through the annular port 116, and communication between passages 111 and 117 is interrupted. The valve of Figure 6 likewise uses a plurality of sleeves and rings to form recesses for accommodating the seal rings. Thus the body is bored to provide the two aligned openings 118 and 119, which are interconnected by opening 120 of slightly smaller diameter. Bore 118 serves to accommodate the ring 121, ported sleeve 122, and ported sleeve 123. Bore 119 is similarly fitted with ring 124, ported sleeve 125, and ported sleeve 126. The annular space 127 between the inner ends of the sleeves 123 and 126 is occupied by the resilient seal ring 128. The annular recess 129 formed between the adjacent ends of the ported sleeves 122 and 123 is occupied by the resilient seal ring 131. The space or recess 132 formed between ring 121 and ported sleeve 122 is occupied by the resilient seal ring 133. Similarly the space 134 between sleeves 125 and 126 is occupied by the seal ring 135, and the space 136 between ring 124 and sleeve 125 is occupied by seal ring 137. The complete assembly of sleeves, seal rings and rings 121 and 124 is held in proper position by the threaded end bushings 138 and 139. Movement of the member 114 between extreme operating positions is limited by the snap rings 141 and 142.

Operation of the embodiment shown in Figure 6 is similar to that illustrated in Figure 3. For the position of member 114 illustrated, fluid pressure applied to passage 111 is applied through port 115 to the passages 117 and 113. At the same time passage 113 is sealed with respect to passage 112. When member 114 is moved to the left to its limiting position, passage 111 is sealed with respect to passage 117, and passage 113 is placed in communication with passage 112 through the annular port 116. Here as in Figure 5, the sleeves 122 and 123 which hold the seal ring 131 in place, and the sleeve 125 and 126 which hold the seal ring 134 in place, permit venting off of fluid pressure from behind the seal rings in such a manner as to prevent their displacement during normal operation of the valve, substantially as has been described previously in connection with Figures 2A to 2D inclusive. It will be evident that in Figure 6 the passage between 113 and 117 secures proper direction of flow through the two ports 115, 116, while in Figure 3 the same purpose is accomplished by the use of one internal and one external set of rings.

Figure 7 shows another embodiment of the invention in which the inner member has passages for making pipe connection to the same, and the outer member is movable between operating positions. Thus the inner member 146 is provided with the inlet and outlet passages 147 and 148, which are adapted to be connected to piping, and which are upon opposite sides of an annular barrier 149. The outer member 151 is bored to provide the aligned openings 152 and 153, which slidably accommodate the inner member 146. Member 151 also has an annular groove or recess 154 which is in the vicinity of the barrier 149, and which serves for open position of the valve to establish communication between passages 147 and 148. It will be noted that the inner member 146 has openings 156 and 157 upon opposite sides of the barrier 149, to permit free flow of fluid past the barrier, for the position of the parts illustrated in Figure 7.

The peripheral portion of the barrier 149 is provided with an annular groove or recess 158, which accommodates the resilient seal ring 159. That corner of the recess 158 which is on the outflow side, is connected to the outflow passage by one or more ducts 161.

Leakage between the outer and inner members 151 and 146, at the ends of these members, is prevented by suitable means such as the resilient seal rings 162 and 163.

Because the piping is connected to the inner member 146, it is convenient in this instance to move the outer member 151 between limiting positions. Movement to the left as viewed in Figure 7 is limited by the end flange 164, and movement to the right limited by the snap-on ring 166. When member 151 is moved to the left of the position shown in Figure 7, the annular portion 167 is brought to a position in which it surrounds the periphery of barrier 149, and makes sealing engagement with the ring 159. Upon movement of the member 151 to the right, seal ring 159 is disengaged with respect to the annular portion 167, and the parts returned to the open position illustrated in Figure 7. Upon movement from closed to open position, the vent duct 161 operates in the same manner as previously described, to prevent dislodgment of the seal ring. In addition the clearance between the metal periphery of barrier 149 and the inner periphery of portion 167 serves to control fluid flow during opening, as previously explained.

Figure 8 shows another embodiment of the invention somewhat similar to Figure 7. In this case the inner member 171 is provided with end flanges 172 and 173, for making connection with associated piping. The annular barrier 174 is connected to the end portions of the body by the spaced webs 176. The outer body 177 is bored to provide the openings 178 and 180, which have a sliding fit upon the cylindrically machined end portions of the body. Leakage from the ends of the member 177 is prevented by the resilient seal rings 179 and 181. Member 177 has an annular recess 182 to accommodate fluid flow past the barrier 174 for open position of the valve illustrated in Figure 8. When member 177 is moved to the left to full closed position, portion 183 is positioned to surround the periphery of the barrier 174 and to make sealing engagement with resilient seal ring 184. As in the case of Figure 7, this seal ring 184 is accommodated in the annular groove or recess 186. The seal ring 184 is accommodated in the groove or recess 186, which in turn has one corner of the same connected by duct 187 with the outflow side of the valve. The inflow and outflow passages 188 and 189 are in this instance formed in substantially the same manner as in Figure 7, and when installed the inner member of the valve remains stationary, while the outer member 177 is connected to suitable operating means for moving the same between open and closed position.

Figure 9 illustrates another embodiment of the invention somewhat similar to the embodiment of Figure 6, but with certain simplified features. In this case the body member 190 is bored to receive a number of rings and sleeves, all of which have substantially the same external and internal diameters. Thus the two aligned bores 191 and 192 of the body are connected by the intermediate smaller diameter bore 192a. The bore 191 is fitted with rings 193, 194, 195, 196, 197 and 198. Rings 194, 195 form the end portions of the ported sleeve 199, rings 196 and 197 similarly form the end portions of ported sleeve 201, and ring 198 forms the end portion of ported sleeve 202.

Bore 192 is similarly fitted with rings 203, 204, 205, 206, 207 and 208. Rings 204 and 205 are formed as the end portions of the ported sleeve 210, rings 206 and 207 as end portions of ported sleeve 211, and ring 208 as the end portion of ported sleeve 212. Resilient O rings 213, 214 and 215 are disposed respectively between metal rings 193 and 194, 195 and 196, and 197 and 198. Resilient ring 216 is similarly disposed between metal rings 203 and 204, resilient ring 217 between metal rings 205 and 206, and resilient ring 218 between metal rings 207 and 208. The two assemblies of metal and resilient rings just described are retained in place by the end threaded bushings 219 and 220. The metal valve or plunger member 221 has a sliding fit within the end bushings 219 and 220, and within all of the metal rings previously described. The dimensioning is such that the resilient O rings are compressed slightly in a radial direction, in order to obtain the desired fluid seal. The end portions 222 of member 221 are shown threaded to facilitate attaching the same to operating devices. The fluid passages 223, 224 and 225 provided in the body correspond generally to the passages 73, 74 and 75 of Figure 4. Passage 223 communicates with the body bore through the ported sleeve 201, passage 224 communicates through the ported sleeve 210, and passage 225 communicates with the body bore through the ported sleeve 199, and by means of an additional body passage 226, through the ported sleeve 211. The valve member 221 is provided with annular ports 228 and 229.

Suitable means is provided such as the end collars 231 and 232, for limiting the movement of member 221 between extreme operating positions. For the position illustrated in Figure 9 flow may occur through passage 223, port 228, to the passage 225. Movement of member 221 to its left hand limiting position serves to bring the periphery of member 221 into sealing engagement with the seal ring 214, thus interrupting flow from passage 223 to passage 225. At the same time however seal ring 217 is brought out of sealing engagement with the periphery of member 221, and passage 225 is placed in communication with the passage 224, through the passage 226, and port 229. Here again the retaining grooves formed for the seal rings 214 and 217, are vented to the outflow side, in the same manner as has been previously described for the other modifications.

The embodiment of Figure 9 also shows means for lubricating the device. Thus the body is drilled to provide the holes 236, 237 and 238, which communicate respectively with the ported sleeve 212, the space between the seal rings 213 and 216, and the ported sleeve 201. The inner ends of the threaded bushings 219 and 220 are shown provided with seal gaskets or rings 239 and 241, to prevent escape of lubricant. Suitable pressure lubricating fittings 242 are shown attached to the lubricating ducts 236, 237 and 238.

Figure 10 illustrates how my invention can be incorporated in a valve of the globe type. In this instance the valve body 251 is provided with inlet and outlet passages 252 and 253, and is provided with a valve seat 254 having a conical shaped seating surface 256. The valve member 257 is attached to the valve stem 258, the exterior end of which is secured to suitable operating mechanism for moving the valve member toward or away from the seat. The valve member is shown formed of two parts 259 and 261, which are secured together by suitable means such as the threaded stud 262. The peripheral portions of the parts 259, 261 are shaped in such a manner that they provide between them an annular groove 263, for receiving the resilient O ring 264. The corner recess 266 of the groove 263, on the outflow side, is vented to the outlet passage by suitable means, which in this instance includes one or more ducts 267, which communicate with the recess 266 through the clearance 268. The clearance 268 between the parts 259 and 261 may provide for fluid leakage because of normal surface imperfections of the adjacent parts by dimensioning to form a clearance, or if desired additional ducts or grooves can be provided. Part 261 is provided with a depending flow controlling lip 269 which is generally cylindrical shaped, and which has a relatively snug fit within the seat 254.

For the closed position of the valve illustrated in Figure 10 the resilient O ring is compressed and serves to form an effective seal to resist inflow pressure. When one commences to move the valve member 257 to open position, the resilient O ring is moved away from the conical seating surface 256, to a position such as illustrated in Figure 11. During this initial opening movement the seat ring is retained within its groove because the groove recess 266 is vented to the outflow side. For the partially open position illustrated in Figure 11 only a small amount of flow can occur through the clearance 271, between the stationary seat and the depending lip 269. The seal ring has contracted radially against the conical shaped surface 270, whereby it is held by its resilience within the recess 266. The flow past the resilient O ring is not of such velocity as to tend to cause it to leave its groove. Full open position of the valve member is illustrated in Figure 12. The lip 269 is now moved clear of the stationary seat 254 to provide a substantially unrestricted flow orifice.

Figures 13 to 15 inclusive illustrate a modification of the valve shown in Figure 10, particularly in that a planar seating surface is employed, instead of a conical surface. Thus in this instance the stationary valve seat 272 which is formed on the body, is provided with a flat seating surface 273. The valve member 274 is formed of the separate parts 276 and 277, corresponding to the parts 259 and 261 of Figure 10. Part 277 is provided with a depending lip 278 corresponding to the lip 269. The annular groove 279 in this instance is formed between the two parts 276 and 277, and accommodates the resilient O ring 280. One side wall 281 of this groove, which is provided by the outer periphery of part 277, is beveled, and ring 280 is dimensioned whereby it is normally stressed radially. Thus the ring is retained within the groove to prevent the same from dropping out during operation or handling of the valve. It is assumed in this instance that pressure is applied to the top of the valve member rather than from the under side as in Figure 10. Therefore the corner or recess 282 of the groove 279 is vented to the outflow side, by the interface clearance 283, and the duct 284.

Figure 14 illustrates initial opening movement of the valve member from the full closed position of Figure 13. At this time only restricted fluid flow can occur through the clearance 286 between the lip 278 and the inner periphery of the valve seat 272. Therefore during this initial opening movement the velocity of fluid flow past the resilient O ring 280 is insufficient to dislodge this ring. Figure 15 illustrates the valve member moved to substantially full open position thereby forming a substantially unrestricted flow orifice.

It will be evident that by modification of the parts, the arrangement of Figure 10 can be adapted to application of inflow pressure to the top rather than the bottom side of the valve member. Thus as shown in Figure 16 the two parts 287 and 288 of the valve member provide a recess 289 for receiving the resilient O ring 291. The corner 292 of the recess, which is on the outflow side of ring 291, is vented to the outflow side through the interface plane 293, and the ducts 294.

In the embodiment of Figure 17 the valve member 296 includes the parts 297 and 298 which are formed to provide the groove 299 for the resilient O ring 301. The lower inner corner of groove 299 is vented to the outflow (upper) side through opening 302. The stationary seat ring 303 is provided with a conical surface 304 against which the ring 303 seals, and also a cylindrical surface 306 into which the cylindrical portion 307 of the valve member fits for closed position. Assuming that the valve member has inflow pressure applied to its lower side, during initial opening movement the restricted clearance between surface 306 and portion 307 serves to control the flow and thus prevent the ring 301 from being blown from its groove. For full open position the valve member is lifted clear of the seat to provide an adequate flow orifice.

From the foregoing description it will be evident that my valve has a number of advantageous characteristics. Because of the use of a resilient sealing ring it is possible to maintain bubble-tight shut-off under relatively high operating pressures, as for example pressures of the order of 1000 p. s. i. or more. Because of the novel way in which fluid pressures acting upon the seal ring are controlled, the ring is not dislodged from its accommodating recess during normal operation. In the embodiments of Figures 1 to 8 the operating member is substantially balanced with respect to the fluid pressure applied, and therefore a relatively small amount of effort is required to move the valve between open and closed positions. The actual operating forces required depended somewhat upon the extent of lubrication between the seal rings and the surfaces with which they are in sliding contact.

While my valve has been designed primarily for use with high pressure air and other gases, it will operate satisfactorily with various liquids. It has been found that when using the valve on liquids the venting of the recess which accommodates the seal ring is advantageous in that it again tends to prevent dislodgment of the seal ring during normal operation.

I claim:

1. In a valve construction, an outer body member, an inner valve member, said members being relatively movable with respect to each other between open fluid flow and closed valve operating positions, one of said members being formed to provide a fluid pressure inflow passage for connection to a source of fluid under pressure and an outlet passage for connection to a low pressure system to which fluid is to be supplied, a portion of the body member providing an opening serving to connect the passages for open position of the valve, the inner member having a portion cooperating with said first named portion, said two portions having annular surfaces which are positioned in close proximity on an annular interface area, which generally surrounds said opening for closed position of the valve and which surfaces are displaced apart for open position of the valve, an annular recess formed in one of said portions and interrupting the corresponding annular surface of the same, said recess having a bottom surface extending generally in spaced parallel relationship to said interface area and two opposed side faces which extend generally laterally with respect to the interface area, an O-type seal ring of resilient material loosely accommodated in said recess, said seal ring being dimensioned to be normally compressed across one diameter of its section between said bottom recess surface and the annular surface of the other portion to establish a seal between said portions when said members are in closed valve operating position with said annular surfaces in close proximity, differential fluid pressure between the inlet and outlet passages for closed valve position serving to compress the seal ring across a diameter of its section which is generally at right angles to said first named diameter and also serving to urge said ring into sealing engagement with one of said two side faces of the recess, means serving to vent that corner of said recess which is formed by intersection of the bottom surface with said one side face, to the outflow passage, when the valve is in closed position, and means for effecting relative movement between said members between full open fluid flow and closed valve operation positions, said seal ring being exposed for dislodgment from said recess during such relative movement and being held against such dislodgment by fluid pressure acting on the same in a direction to urge the seal ring toward said corner.

2. A valve as in claim 1 in which said annular surfaces are cylindrical to interfit on a cylindrical interface area.

3. A valve as in claim 1 in which said annular surfaces are substantially planar.

4. A valve construction as in claim 1 in which the recess is formed at least in part by a separate annular member loosely carried by the corresponding portion and in which the venting means is formed by the clearance between said member and the corresponding portion.

5. A valve construction as in claim 1 in which the recess is formed in that portion which is provided by the outer member.

6. In a valve construction, an outer body member, an inner valve member, said members being relatively movable with respect to each other between open fluid flow and closed shut off valve operating positions, one of said members being formed to provide a fluid pressure inflow passage for connection to a source of the fluid under pressure and an outlet passage for connection to a low pressure system to which fluid is to be supplied, a portion of the body member providing an opening serving to connect the passages for open position of the valve, the inner member having a portion cooperating with said first named portion, said two portions having annular surfaces which are positioned in close proximity on an annular interface area which generally surrounds said opening for closed position of the valve and which surfaces are displaced apart for open position of the valve, an annular recess formed in one of said portions and interrupting the corresponding annular surface of the same, said recess having a bottom surface extending generally in spaced parallel relationship to said interface area and two opposed side faces which extend generally laterally with respect to the interface area, an O-type seal ring of resilient material loosely accommodated in said recess, said seal ring being dimensioned to be normally compressed across one diameter of its section between said bottom recess surface and the annular surface of the other portion to establish a seal between said portions when said members are in closed valve operating position with said annular surfaces in close proximity, differential fluid pressure between the inlet and outlet passages for closed valve position serving to compress the seal ring across a diameter of its section which is generally at right angles to said first named diameter and also serving to urge said ring into sealing engagement with one of said two side faces of the recess, means serving to vent that corner of said recess which is formed by intersection of the bottom surface with said one side face, to the outflow passage, when the valve is in closed position, means for effecting relative movement between said members between full open fluid flow and closed valve operating positions, a substantial portion of said seal ring being exposed for dislodgment from said recess during such relative movement and being held against such dislodgment by fluid pressure acting on the same in a direction to urge the seal ring toward said corner, and means forming a line flow restriction between said members on the outflow side of the seal ring for an interval of relative movement between said members from full closed shut off position toward open position, said restriction being interposed between the seal ring and the region of communication between the venting means and the outflow passage as such relative movement commences to expose the O ring to dislodgment from the recess.

7. A valve as in claim 6 in which said annular surfaces are cylindrical to interfit on a cylindrical interface area.

8. A valve as in claim 6 in which said annular surfaces are substantially planar.

9. A valve as in claim 6 in which the recess is formed, at least in part, by a separate annular member loosely carried by the corresponding one of said portions, and in which the venting means is formed by the clearance between said member and said portion.

10. A valve construction as in claim 6 in which the annular recess is formed in the outer one of said portions.

11. A valve construction as in claim 6 in which the recess is formed in the outer one of said portions and at least in part by a separate annular member loosely carried by the corresponding one of said portions, and in which the venting is formed by the clearance between said member and the corresponding portions, said annular member also forming a part of the means for forming said flow restriction.

12. In a valve construction, an outer member having a cylindrical bore, a circularly contoured plunger-like valve member disposed axially in the bore, a plurality of annular members assembled within the bore and spaced apart to provide at least one annular recess, inflow and outflow passages formed in the outer member, said valve member being formed to establish communication between the inflow and outflow passages for one operating position of the valve member corresponding to open position of the valve, a resilient seal ring disposed in said annular recess, an annular shoulder portion formed by said valve member and adapted for closed position of the valve member to be positioned in sealing relationship with said seal ring whereby said seal ring serves to interrupt flow between the inflow and outflow passages, said shoulder portion for open position of the valve member being in spaced relation to the seal ring whereby the seal ring is exposed for dislodgment from said recess, clearance between one of said annular members and said outer member forming a duct serving to establish communication between the bottom of said recess and the outflow passage, whereby fluid pressure acts to hold the seal ring within said recess.

13. In a valve construction, a valve body having a bore therein, inlet and outlet passages communicating with said bore, a valve member reciprocable in said bore and having a surface portion cooperating with a surface portion of said bore between said inlet and outlet to control fluid flow through said bore, one of said surface portions having an annular generally rectangular groove therein, an O ring seal positioned in said groove, said ring being dimensioned when unstressed to be deformed across one diameter thereof between the base of said groove and said other surface portion in valve closed position to establish a seal between said portions, differential fluid pressure between the inlet and outlet passage in valve closed position serving to deform the seal ring across a diameter thereof which is generally at right angles to said first mentioned diameter and also serving to urge said ring into sealing engagement with one side face of said groove, and means adapted to vent that corner of the recess formed by the base of said recess and said one side face whereby said O ring is urged into said corner when the pressure in the bore exceeds the pressure in the vent means, said last means serving to retain the O-ring against dislodgment from said groove when the valve member is moved between closed and open positions of the same, the O ring being exposed for such dislodgment during such movement.

References Cited in the file of this patent

UNITED STATES PATENTS

| | | |
|---|---|---|
| 744,643 | Swan | Nov. 17, 1903 |
| 1,517,593 | Slate | Dec. 2, 1924 |
| 1,721,114 | Hampton | July 16, 1929 |
| 2,011,674 | Canady | Aug. 20, 1935 |
| 2,481,482 | Green | Sept. 13, 1949 |

FOREIGN PATENTS

| | | |
|---|---|---|
| 11,477 | Great Britain | 1886 |